United States Patent

Morel et al.

[11] Patent Number: 5,308,307
[45] Date of Patent: May 3, 1994

[54] WORKING ROLL FOR A ROLLING MILL

[75] Inventors: Michel Morel, Chelles; André Ravenet, Les Mureaux, both of France

[73] Assignee: CLECIM, Certy-Pontoise, France

[21] Appl. No.: 805,952

[22] Filed: Dec. 12, 1991

[30] Foreign Application Priority Data

Dec. 14, 1990 [FR] France .................. 90 15725

[51] Int. Cl.$^5$ ............................................ B21B 27/05
[52] U.S. Cl. .......................................... 492/1; 492/4; 492/16; 72/241.6; 72/252.5
[58] Field of Search ...................... 72/20, 241.6, 252.5, 72/238, 239; 29/113.1, 113.2, 116.1, 116.2, 117, 72/125; 100/47, 162 B, 170; 492/1, 2, 4, 5, 16, 38, 47

[56] References Cited

U.S. PATENT DOCUMENTS

| | | | |
|---|---|---|---|
| 4,089,094 | 5/1978 | Kaira | 29/116.2 |
| 4,447,940 | 5/1984 | Appenzeller et al. | 29/116.2 |
| 4,599,770 | 7/1986 | Kato et al. | |
| 4,644,860 | 2/1987 | Brendel | 72/241.6 |
| 4,757,584 | 7/1988 | Pav et al. | 100/162 B |
| 4,760,631 | 8/1988 | Brendel | 492/4 |
| 4,856,154 | 8/1989 | Nikulainen et al. | 29/113.1 |
| 5,001,820 | 3/1991 | Yoshida et al. | 492/2 |

FOREIGN PATENT DOCUMENTS 0178233  4/1986  France .
2092928  8/1982  United Kingdom .

*Primary Examiner*—Lowell A. Larson
*Assistant Examiner*—Thomas C. Schoeffler
*Attorney, Agent, or Firm*—Pollock, Vande Sande & Priddy

[57] ABSTRACT

An installation for rolling a flat product, comprising a support stand composed of two spaced uprights between which is placed a plurality of superposed rolls, between which a squeezing force is applied, for rolling a product (B) passing between two work rolls (A, A'). At least one of the work rolls (A) consists of a tubular jacket mounted for rotation about a stationary central shaft along which is provided a plurality of spaced bushes, isolated from one another. The work roll is associated with a feed circuit for circulating pressurized oil in order to form an oil film between each bush and the jacket. The pressure of the oil film between each bush and the corresponding zone of the jacket is individually adjusted for the application of radial forces of adjustable intensity per bush.

5 Claims, 4 Drawing Sheets

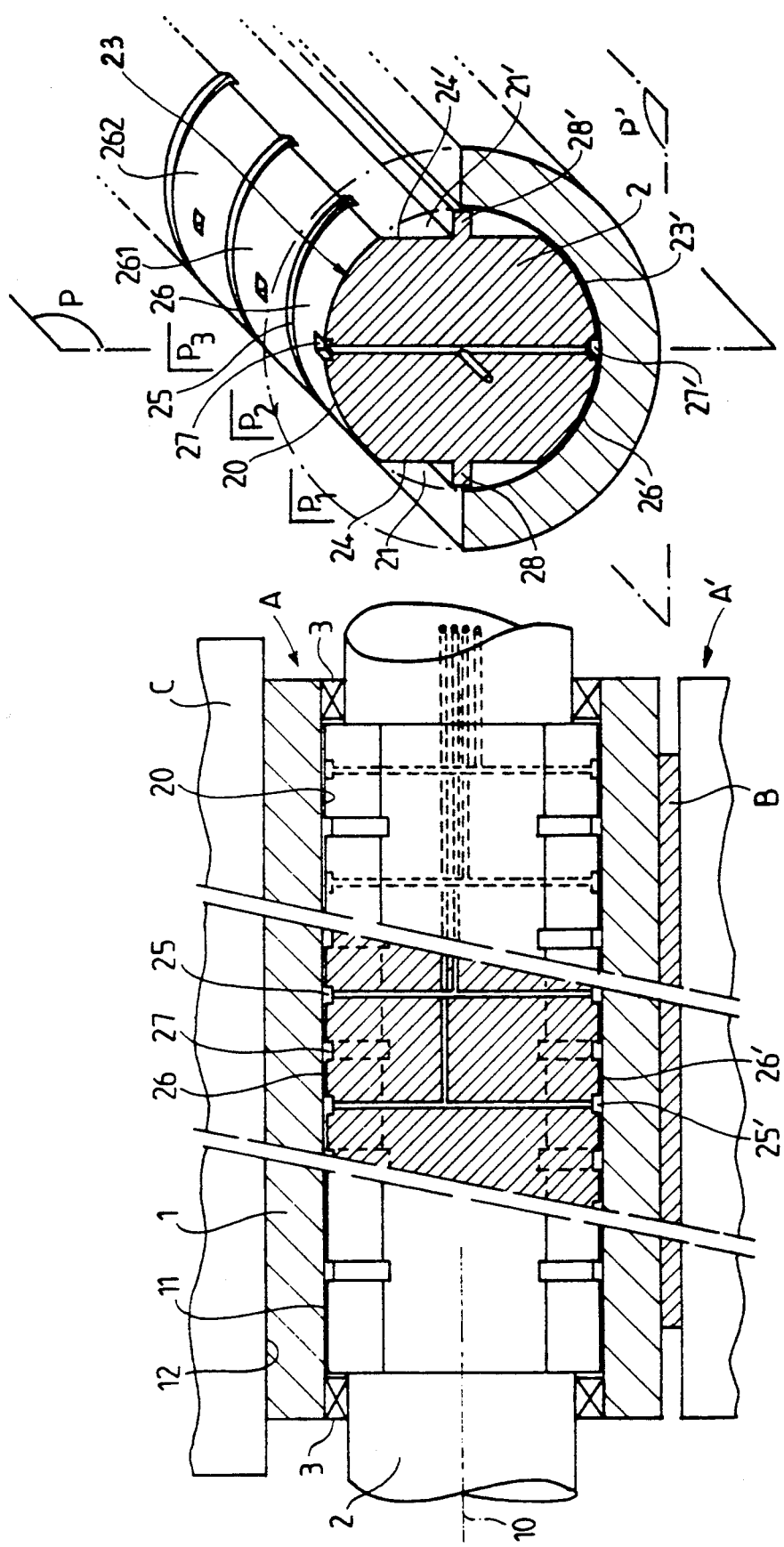

WORKING ROLL FOR A ROLLING MILL

FIELD OF THE INVENTION

The subject of the invention is a rolling installation applicable, in particular, to rolling trains for hot rolling metal sheets or strips.

DESCRIPTION OF THE PRIOR ART

Generally, a rolling mill comprises two rolling rolls, between which the product to be rolled passes, and which abut, on their sides opposite the product, against backup rolls. The assembly is mounted inside a fixed stand comprising means for squeezing the rolls, generally by bearing on the ends of at least one backup roll, so as to produce a predetermined amount of crushing of the product passing between the work rolls.

In rolling mills of the "four-high" type, each work roll bears directly on a backup roll, whereas, in "six-high" rolling mills, intermediate rolls are interposed between the work rolls and the backup rolls. Other arrangements are, however, possible.

Rolling mills have been used for a very long time and have been the subject of a great number of improvements, especially for correcting certain defects in the product.

In fact, as the squeezing forces are applied, by means of chocks, on the ends of the backup rolls, the latter tend to deflect and there is a risk that the edges of the product will be crushed more than the central part. Moreover, after exiting the rolling mill, the rolled product, which is no longer under tension, often has flatness defects caused by non-homogeneous distribution of the stresses over the width of the product.

In order to correct such defects, different means are known, which permit, especially, correction of the profile of the gap and/or of the distribution of the stresses.

For example, it is possible to modify the profile of at least one of the backup rolls by using so-called inflatable or deformable-jacket rolls. It is thus possible to correct the distribution of the stresses along the bearing generatrix, but this correction effect is transmitted to the product by means of the work roll.

It is also possible to correct the profile of the work rolls themselves. In fact, these rolls, which are generally solid rollers, are brought, during service, to a fairly high temperature, and it has been suggested to act on the relative expansions by associating, with each work roll, a boom for spraying a cooling fluid acting in a controlled manner on adjacent zones distributed over the entire length of the roll. It is thus possible slightly to modify the diameter of the roll in these zones, but possibilities for adjustment remain limited.

It is also possible to exert bending forces, in one direction or in the other, on the two ends of the shaft of the work roll, the latter being equipped with chocks which are guided, parallel to the squeezing plane, in the two uprights of the stand, and on which vertical forces can be exerted in either direction by means of jacks. Such a device is satisfactory and is in general use, but it does not permit precise and localized adjustment of the distribution of the stresses over the width of the product.

GENERAL DESCRIPTION OF THE INVENTION

The invention proposes to provide a solution to the entire problem by means of arrangements which permit direct action on at least one work roll, i.e., as close as possible to the product, by exerting localized actions on adjacent zones distributed over the entire length of the roll, so as to adjust the distribution of the stresses over the entire width of the product in a flexible and precise manner.

The invention thus applies, generally, to installations for rolling flat products, comprising a support stand composed of two spaced uprights between which is placed a plurality of superposed rolls mounted rotatably about substantially parallel axes and between which is applied a squeezing force for rolling a product passing between two work rolls.

In accordance with the invention, at least one of the work rolls consists of a tubular jacket having cylindrical inner and outer faces and being mounted rotatably about a stationary central shaft along which is provided a plurality of spaced bushes each having a cylindrical outer face whose diameter a part from play, is substantially equal to that of the inner face of the jacket and covers an angular sector of the latter. The roll is associated with means for circulating pressurized oil inside the jacket in order to form an oil film between each bush and the jacket and, as each bush is separated from the adjacent bushes by means for isolating the oil film, said means for placing the oil in circulation comprise means for individual adjustment of the pressure of the oil film of each bush, for the application, on the corresponding zones of the jacket, of radial forces of adjustable intensity, per bush.

The invention thus enables the jacket of at least one work roll to be ovalized in independent zones distributed over its entire length, and therefore makes it possible to effect corrections of flatness and/or of cross-profile to the rolling direction of the rolled product.

In a particularly advantageous manner, the bushes are distributed over the central shaft in two diametrically opposed rows centered substantially on the plane perpendicular to the plane of passage of the product and passing through the axis of the roll. Preferably, the bushes of the two rows are placed symmetrically on both sides of the axis so as to form, along the central shaft, a sequence of pairs of bushes, opposed two-by-two, the two bushes of each pair being connected to a common means of individual adjustment, at the same level, of the pressure of the oil film in the bushes.

In a preferred embodiment, the central shaft has, over its entire length, at least one cylindrical face which covers at least one angular sector and is divided into a sequence of adjacent segments by a plurality of circular grooves placed in spaced planes perpendicular to the axis. Each segment with a cylindrical face included between two successive grooves forms a bush, and the grooves form the means for isolating the oil film of the bush they surround with respect to the adjacent bushes.

The stationary shaft advantageously comprises two circular cylindrical faces separated from each other by two longitudinal recesses and covering, respectively, two diametrically opposed angular sectors, each cylindrical face being divided by circular grooves into a series of bushes.

As the bearings preferably operate by means of a hydrostatic effect, each bush is connected to a pressurized-oil-feed circuit via an individual duct emerging via at least one orifice for distributing the oil over the bearing face of the bush, and each individual feed duct is associated with a separate means for adjusting the pressure of the oil film along the outer face of the bush.

In a particularly advantageous application, the pressures in the oil film of each bush are adjusted on the basis of measurements made directly on the product.

To this end, such a roll may be associated with a flatness-control roller equipped, in a known manner, with a series of sensors for measuring the distribution of the stresses in adjacent zones which are staggered over the entire width of the rolled product, such that each zone of the control roller corresponds to a zone covered by a bush of the roll and the pressures of the oil film in the various bushes are adjusted individually as a function of the indications given, respectively, by the sensors in the corresponding zones of the control roller.

The invention also covers a rolling roll for implementing the foregoing arrangements.

In fact, a rolling-mill work roll generally comprises an active cylindrical part equipped, at each end, with a journal rotating in a rolling bearing carried by a chock guided on the corresponding upright of the stand and on which bending forces may be applied.

In a particular embodiment, according to the invention, the two ends of the work roll are not mounted in the same manner.

In fact, in order to permit easy dismantling of the roll, the tubular jacket is composed of an open end, enabling it to be slipped over the central shaft and an end closed by a backplate, the central shaft extending from a free end outside the jacket as far as an inner end placed in the vicinity of the backplate. The work roll is then guided on the two uprights of the stand, respectively by guide parts provided on the free end of the shaft and by a chock mounted on the backplate of the jacket and comprising an outer guide part and an inner part which is integral in rotation with the jacket, the latter being mounted rotatably on the central shaft about two bearings placed, respectively, on the free end of the shaft, on the side of the open end of the jacket, and on the inner end of the shaft, on the side of the closure backplate of the jacket.

BRIEF DESCRIPTION OF THE DRAWINGS

In order that the invention may be more clearly understood, a description of several embodiments will now be given by way of example and with reference to the appended drawings.

FIG. 1 is a schematic section view of a work roll equipped with the arrangements according to the invention.

FIG. 2 is a partial perspective view of the roll.

DESCRIPTION OF PREFERRED EMBODIMENTS

Figure 3:
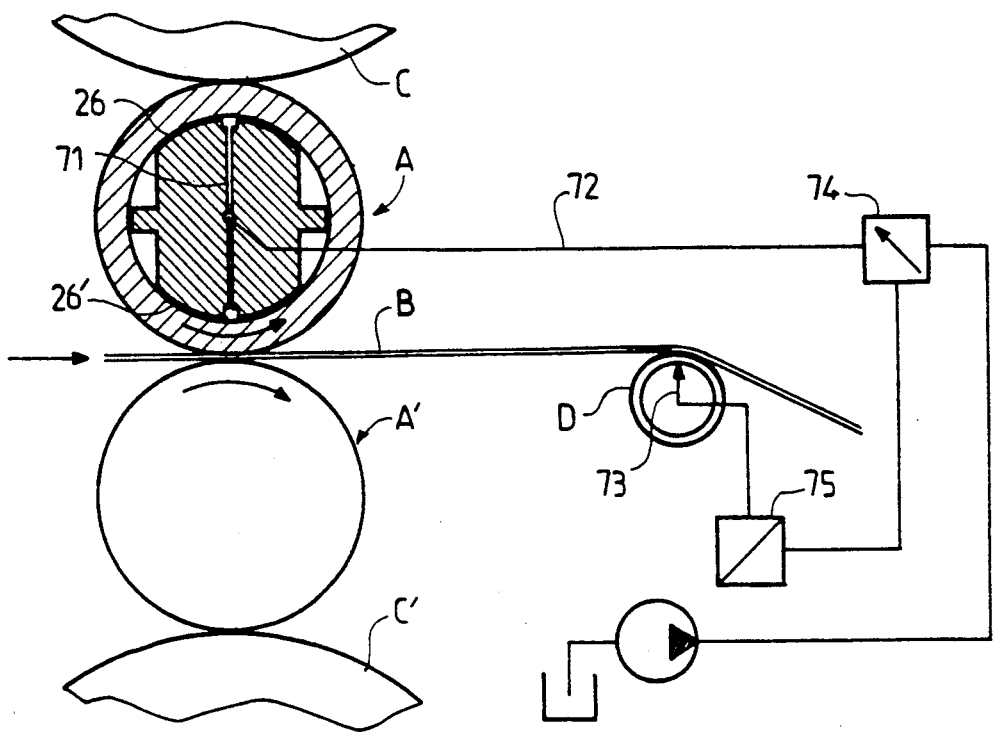
FIG. 3 is a view in transverse section of a roll, showing a device for individual adjustment of the pressure in a bush.

FIG. 1 shows schematically, in axial section, a work roll A delimiting, with an associated roll A', a gap for the passage of a product B to be rolled and bearing, on the opposite side, on a backup roll C.

The work roll A consists of a tubular jacket 1 having a cylindrical form of revolution about an axis 10 and having a cylindrical inner face 11 and a cylindrical outer face 12. The jacket 1 is slipped over a stationary central shaft 2, about which it is mounted rotatably by means of bearings 3 interposed between the two ends of the tubular jacket 1 and bearing surfaces provided with the two ends of the central shaft 2.

As may be seen in greater detail in FIG. 2, the central shaft 2 is equipped with a cylindrical face 20 with a diameter substantially equal to that of the inner face 11 of the jacket 1, leaving only the play necessary for slipping the jacket 1 over the shaft 2.

Moreover, two recesses 21, 21' are provided on the shaft 2 on each side of a plane of symmetry P, perpendicular to the plane P' of passage of the product, i.e., of the vertical plane passing through the axes of the work rolls, and each recess is delimited by a planar face 24, 24', parallel to plane P. The cylindrical face 20 is therefore divided into two circular bands 23, 23' covering diametrically opposed angular sectors centered on the plane P and separated from each other by the planar faces 24, 24'.

Each circular band 23, 23' is divided into a sequence of segments 26, 26' by a series of grooves 25, in the form of circular sectors, placed in spaced planes P1, P2, P3, . . . , perpendicular to the axis 10 of the shaft 2 and hollowed out in the thickness of the latter, similar grooves 25' being provided on the opposite cylindrical band 23'. Each band 23, 23' is thus divided into a row of segments 26, 26', each having the form of an arched rectangle delimited in the longitudinal direction by two successive grooves 25, and in the transverse direction by the two planar faces 24, 24'.

Preferably, the grooves 25, 25' provided, respectively, on the two opposite bands 23, 23' are placed two-by-two in the same plane P1 perpendicular to the axis 10, such that the corresponding segments are disposed in pairs of two diametrically opposed segments 26, 26'.

During rotation of the jacket about the shaft 2, a lubricating fluid is circulated between the cylindrical faces 23, 23' of the shaft 2 and the inner face 11 of the jacket, forming a lubricating film. This film may be produced either hydrodynamically or hydrostatically. In the embodiment shown in FIG. 3, the central part of each segment 26 is provided with a recess 27 in which a duct 71, connected to a pressurized-fluid-feed circuit 72, opens out. In this manner, the oil introduced by the duct 71 into the recess 27 spreads over the entire surface of the segment 26, which thus forms a bush operating in the manner of a hydrostatic bearing. While recess 27 has been shown symbolically in FIG. 2, it is possible to use conventional means for the distribution of the oil, for example, spider-leg grooves.

The grooves 25 which separate the bushes 26 collect the excess oil and discharge it towards the spaces 21, 21' delimited by planar faces 24, 24'. Each of the latter is advantageously provided with a partition 28, 28' which makes it possible to limit the space in which the oil accumulates, the latter being driven preferably, on the downstream side, in the direction of rotation of the jacket 1 relative to the shaft 2. The collected oil can then be discharged by known means.

It can thus be seen that the oil film distributed over each segment 26 is isolated from the films covering the adjacent segments 261, 262 by the circular grooves 25 and the planar faces 24, 24'. In this manner, it is possible, by feeding the ducts 71 opening out at the center of each segment 26 at different pressures, to place the oil films under different pressures and, consequently, to exert on the corresponding annular zones of the inner face 11 of the jacket radial forces whose intensity can be adjusted individually for each zone.

Thus, the action of the pressure between the different bushes 26, 26' and the jacket 1 has the effect of ovalizing the latter in each zone covering a bush and in proportion to the pressure applied in such zone.

In this manner, it is possible to act precisely on the distribution of the stresses applied to the rolled product in successive zones distributed over the entire width of the latter, and thus to make corrections of flatness and-/or of cross-profile to the rolling direction.

To this end, the two segments 26, 26' of a given pair, included between two successive planes P1, P2, are connected, via their respective ducts 71, 71', to the same common feed duct 72 which, as will be seen below, may be equipped with individual means for adjustment of the feed pressure. In this manner, the oil films covering the two diametrically opposed segments 26, 26' are always placed at the same pressure. As a result, the forces applied on the jacket 1 bearing on the shaft 2 are opposed and in balance. As such a balance is obtained in the same manner over each zone of the shaft 2 included between two successive planes P1 and P2, the application of these forces does not give rise to any deflection of the shaft 2 and, conversely, the correction force applied on the jacket 1 is not disrupted by a possible deflection of the latter due to other causes.

As indicated in FIG. 2, as each pair of segments 26, 26' is fed via a common duct 72, the central part of shaft 2 is equipped with a series of parallel pipes which may be either drilled directly into the metal or placed inside a central bore. However, such an embodiment offers no particular problems and has thus not been described in detail. Moreover, insofar as the shaft 2 does not rotate, it would also be possible to place the feed ducts 62 in the recesses 21.

FIG. 3 shows, by way of example, an hydraulic diagram for application to a four-high-type rolling mill, comprising two work rolls A, A' interposed between two backup rolls C, C' and between which a product B passes.

Conventionally, the rolling mill is associated with a flatness-control roller D, placed downstream of the rolling stand and over which the product B is applied under tension. The roller C is equipped with a series of sensors for measuring the stresses applied by the product, and distributed along the roller C so as to measure the distribution of the stresses in successive parallel zones over the entire width of the rolled strip B.

Figure 4:
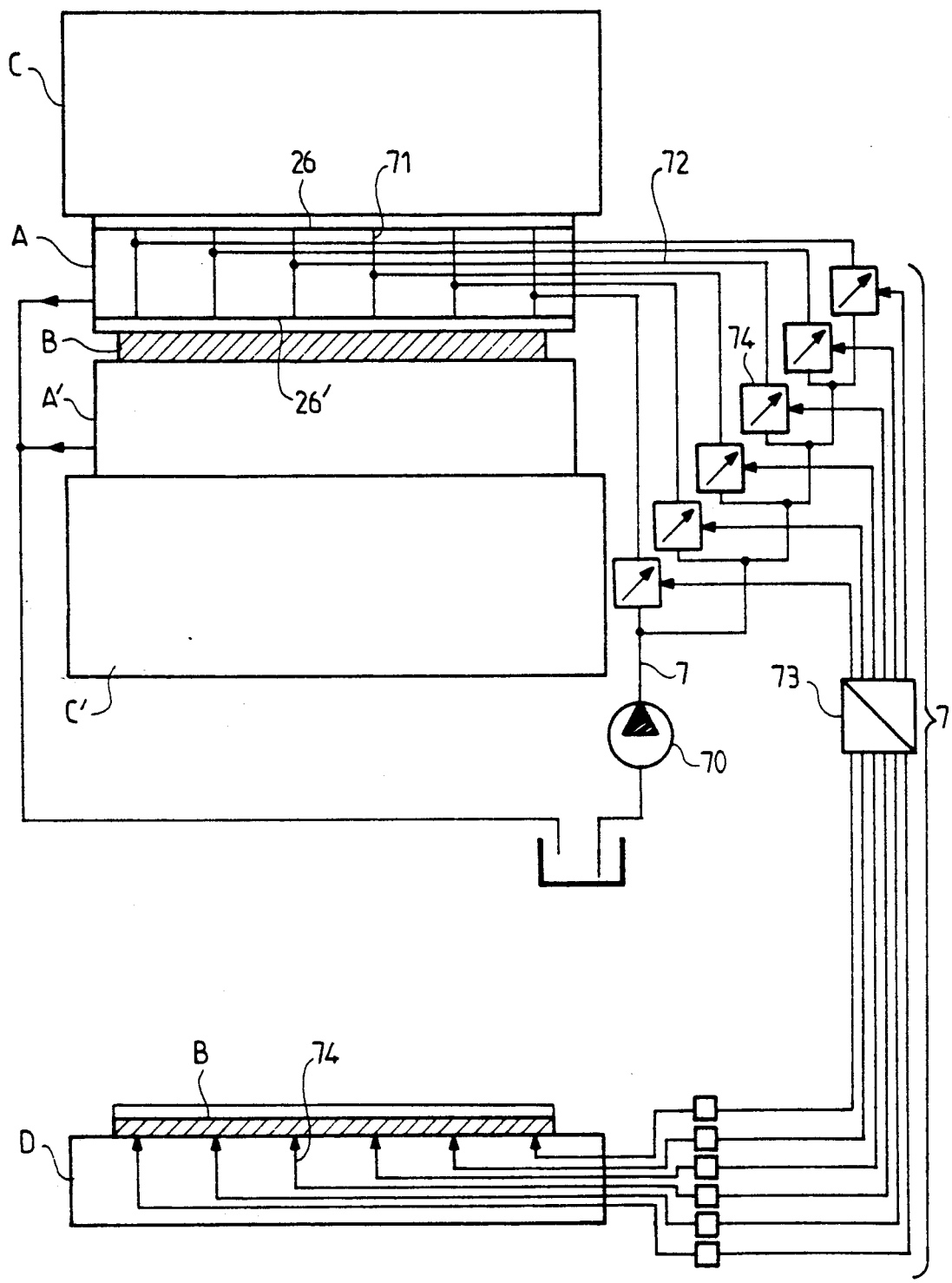
FIG. 4 is a diagram of the whole of a rolling mill equipped with the arrangement according to the invention.

As the work roll comprises, according to the invention, a series of adjacent bushes 26, 261, 262, etc . . . , each zone covered by a bush may, in a particularly advantageous manner, be associated with a zone covered by a sensor of the flatness roller D, in the manner shown schematically in FIG. 4. A general feed circuit 7, comprising a pump 70 and all the necessary elements distributes the pressurized oil into a plurality of ducts 71, each connected to a pair of opposite bushes 26, 26'. The oil which escapes downstream of the bush is recovered and returned to the tank.

Each common feed duct is equipped with an individual pressure regulator 74.

The flatness roller D is itself equipped with a series of sensors 73 distributed over the length of the roller so that each corresponds to a pair of bearings 26, 26'. An adjustment system 75 acts on the various regulators 74 on the basis of indications given by the sensors 73. In this manner, a defect of flatness detected by one or more sensors 73 may be corrected immediately by acting on the pressures exerted on the corresponding zones of the tubular jacket 1. The adjustment system 75 is programmed so as to take into account interactions between the zones and between the work rolls and the product as well as, generally, all other parameters, especially the corrections made elsewhere by acting, in a known manner, on the profile of the backup rolls C, C' and on the bending of the work rolls A, A'.

Figure 5:
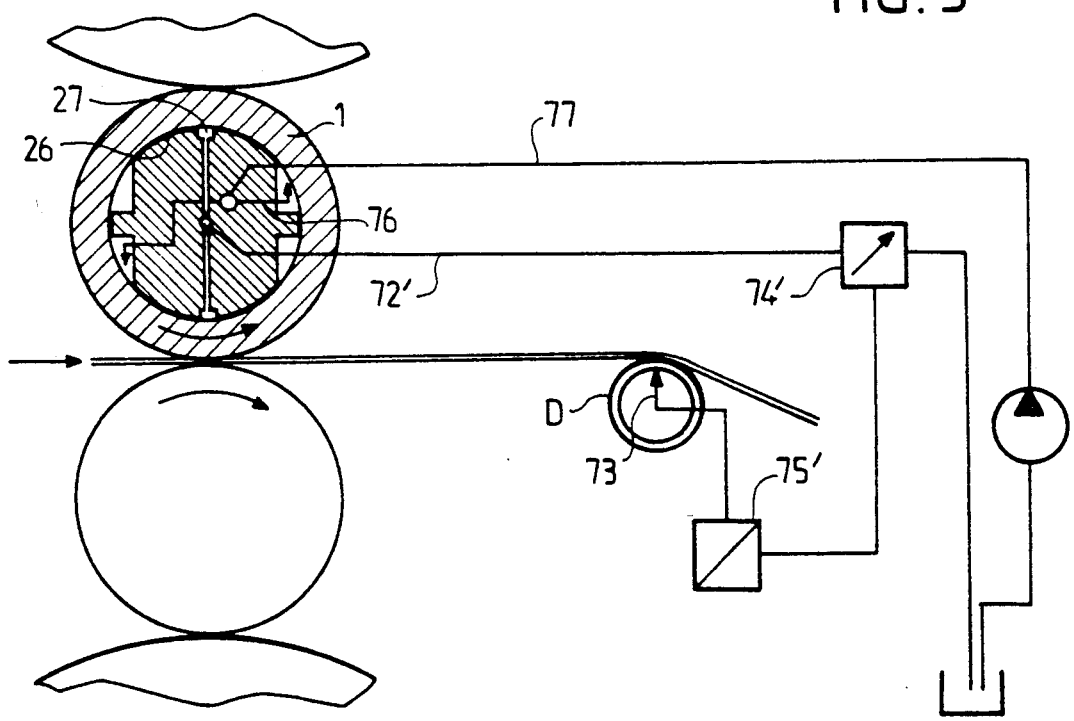
FIG. 5 is a view in transverse section of a further embodiment of the device for individual adjustment of the pressure in a bush.

The oil film to be interposed between each bush 26 and the inner face 11 of the tubular jacket 1 may also be produced by hydrodynamic effect. For example, in the embodiment shown schematically in FIG. 5, a common feed circuit 77 is connected to a plurality of ducts 76, each opening out upstream of each bush 26 in the direction of rotation of the jacket 1. The oil thus introduced upstream is distributed over the entire surface of the bush and escapes downstream, ensuring the carrying of the jacket by means of a wedge effect. The two opposite bushes 26 of a given pair are each provided with a recess 27 forming a pressure tapping and connected to a common duct 72' through which part of the oil circulating along each bush is returned to the tank. A pressure regulator 74' is placed on each duct. As in the embodiments of FIGS. 3 and 4, the level of pressure permitted by each regulator 74' is adjusted by an adjustment system 75' as a function of the indications given by the sensors 73 placed in the corresponding zones of a flatness roller D disposed downstream of the rolling mill. It is thus possible to adjust the pressure in the oil film as a function of any flatness defects detected by the sensors 73.

The two arrangements which have just been described make it possible to correct, almost immediately and by acting directly on the product, the flatness defects as soon as they are detected.

Although the invention has been described with respect to a four-high rolling mill, it may obviously apply to rolling mills of other types, for example six-high rolling mills. Moreover, the essential aim of the invention is to act directly on the work rolls in order to adjust the distribution of the stresses, but it would not be out of the question to apply the same arrangements to other rolls.

A work roll according to the invention is undoubtedly more complex than a conventional work roll which is generally a solid roller, but the considerable advantages provided by the invention largely offset this disadvantage.

Figure 6:
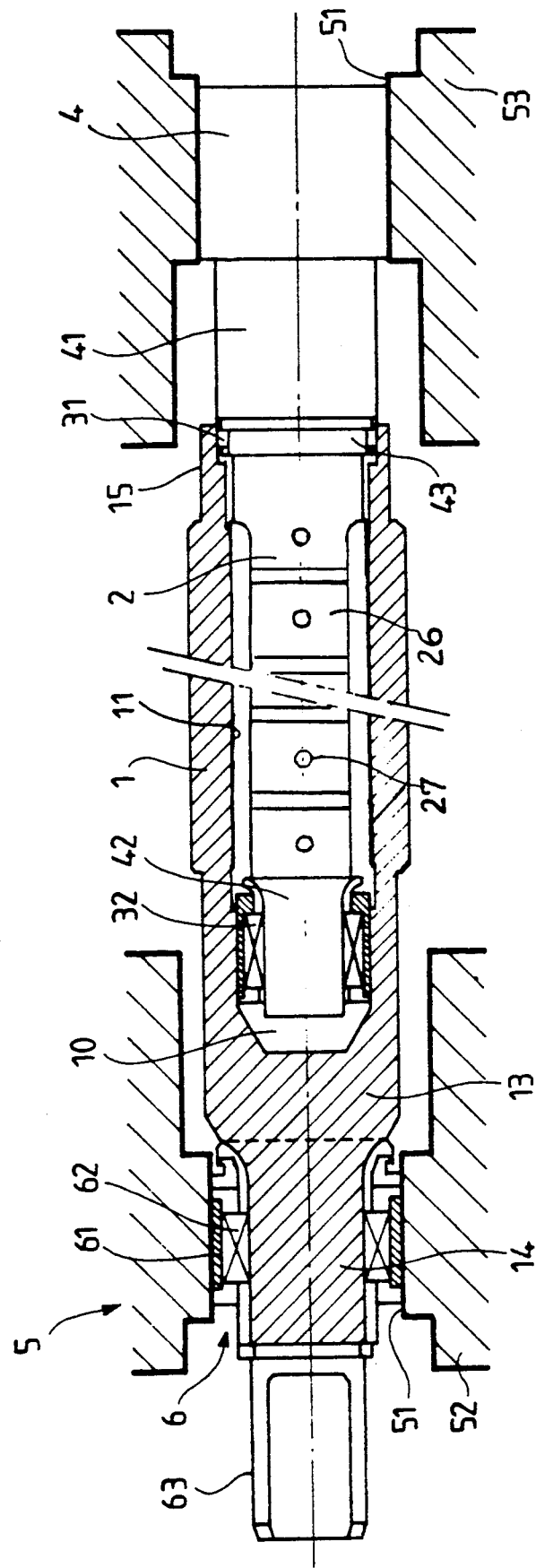
FIG. 6 is a view in axial section of an a further embodiment of the work roll.

Moreover, the work roll which has just been described has been shown only schematically in FIGS. 1 and 2, in a simplified embodiment, but it may also be improved as shown, by way of example, in FIG. 6.

In fact, it is often necessary, in rolling mills, to connect each work roll to a rotational drive means and to make it possible to dismantle the roll for repair or replacement. This is permitted by the arrangement in FIG. 6.

A rolling-mill roll is generally mounted rotatably on two journals, placed at its ends and each rotating in a chock guided, parallel to the squeezing plane, in an aperture provided on the corresponding upright of the rolling-mill stand. If appropriate, vertical forces for bending the roll are applied on the chock.

As may be seen in FIG. 6, the roll according to the invention is associated, on a single side, with a conventional chock 6 slideably mounted in an aperture 51 in one of the uprights 52 of the stand 5 and in which a journal 14 for supporting the roll is rotatably mounted, in a conventional manner, the roll being guided at its other end by a support element 4 which does not rotate and which is mounted slideably in the aperture 51 in the second upright 53 of the stand 5.

To permit dismantling of the roll, the tubular jacket 1 has an open end 15 and is closed at its other end by an end plate 13 in whose axis a journal 14 is formed.

The tubular jacket 1 therefore comprises a blind inner space 10, delimited by the inner face 11 of the jacket and closed on a single side by the backplate 13, into which the shaft 2 can be slipped axially, the shaft, in service, therefore extending inside the housing 10 between a free end 41 and an inner end 42 placed in the vicinity of the backplate 13 of the inner space 10.

As the central shaft 2 does not rotate, its free end 41 is fixed on the support element 4 guided in the aperture 51 in the upright 53 of the stand 5.

As in the previous embodiments, the tubular jacket 1 is centered on the shaft 2 by means of two roller bearings 31, 32.

The bearing 31 is mounted between a cylindrical bearing surface 43 provided on the central shaft 2 and the open end 15 of the jacket 1.

The bearing 32 is placed at the opposite end of the inner space 10, close to the end plate 13 of the jacket 1, and is interposed between the inner face 11 of the latter and a journal 42 provided on the inner end of the shaft 2.

Moreover, the chock 6 itself comprises a casing 61 guided in the aperture 51 in the upright 52 of the stand and on which the outer frame of a bearing 62 bears, the inner frame of the latter being mounted on the journal 14 fixed on the end plate 13 of the jacket 1 closing the inner space 10.

The journal 14 is extended by a drive part 63 on which a rotation-control means (not shown) may be engaged.

It may thus be seen that the tubular jacket 1 is centered on the shaft 2 via the two bearings 31, 32 and guided relative to the stand 5 of the rolling mill, at one end via the chock 6 and at its other end via the fixed guide element 4 which, associated with the bearing 31, acts in the same way as a chock.

As the tubular jacket 1 is thus made axially integral with the shaft 2 by means of the two bearings 31 and 32, the whole may be subjected to bending forces applied on the two ends of the roll by jacks bearing, respectively, on the chock 6 and on the side piece 4. These forces for bending the roll do not disturb the correction of flatness defects, as the shaft 2 is, to this end, always subject to opposing forces, as has been indicated above.

What is claimed is:

1. A working roll for a rolling mill comprising a support stand composed of two spaced uprights between which is placed a plurality of superposed rolls mounted for rotation about substantially parallel axes, respectively two working rolls (A, A') delimiting a gap for passage of a product (B) to be rolled, said working rolls respectively bearing on at least two backup rolls, said working roll comprising
   (a) a stationary central shaft having an axis and a cylindrical outer face;
   (b) a tubular jacket mounted for rotation on said central shaft, said tubular jacket having a cylindrical outer face and a cylindrical inner face with a diameter substantially equal, apart from play, to a diameter of said cylindrical outer face of said shaft;
   (c) said central shaft being provided with two recesses, respectively on each side of a vertical plane of symmetry (P) constituted by a squeezing plane passing through axes of said working rolls (A, A'), said recesses dividing said cylindrical outer face into two circular bands respectively covering two diametrically opposed angular sectors centered on said plane of symmetry (P);
   (d) each said circular band being respectively divided into a sequence of segments by a series of grooves located in spaced planes (P1, P2, P3 . . . ) perpendicular to said axis of said shaft and hollowed out in a thickness of said shaft, said grooves provided, respectively, on two opposite bands being located two by two in same planes and said segments being disposed in pairs of two diametrically opposed segments, each having a form of an arched rectangle;
   (e) means for circulating a pressurized fluid between each segment and an inner face of said jacket, each segment thus constituting a bearing bush which is separated from each adjacent bush of a same circular band by a said groove, said grooves isolating a fluid film of each bush by collecting excess fluid and discharging said excess fluid toward said recesses; and
   (f) means for individual adjustment of a pressure of said fluid film between each bush and a corresponding zone of said jacket for application on said jacket of radial forces of adjustable intensity from bush to bush, the pressure of said fluid film in bushes of each pair being at a same level.

2. A working roll for a rolling mill comprising a support stand composed of two spaced uprights between which is placed a plurality of superposed rolls mounted for rotation about substantially parallel axes, respectively two working rolls (A, A') delimiting a gap for passage of a product (B) to be rolled, said working rolls respectively bearing on at least two backup rolls, said working roll comprising
   (a) a stationary central shaft having an axis and a cylindrical outer face;
   (b) a tubular jacket mounted for rotation on said central shaft, said tubular jacket having a cylindrical outer face and a cylindrical inner face with a diameter substantially equal, apart from play, to a diameter of said cylindrical outer face of said shaft;
   (c) said central shaft being provided with two recesses, respectively on each side of a vertical plane of symmetry (P) constituted by a squeezing plane passing through axes of said working rolls (A, A'), said recesses dividing said cylindrical outer face into two circular bands respectively covering two diametrically opposed angular sectors centered on said plane of symmetry (P);
   (d) each said circular band being respectively divided into a sequence of segments by a series of grooves located in spaced planes (P1, P2, P3 . . . ) perpendicular to said axis of said shaft and hollowed out in a thickness of said shaft, said grooves provided, respectively, on two opposite bands being located two by two in same planes and said segments being disposed in pairs of two diametrically opposed segments, each having a form of an arched rectangle;
(e) each segment being provided with at least one recess, recesses of two segments of a same pair being connected respectively by ducts to a common feed duct;
(f) a general feed circuit distributing pressurized fluid into said feed ducts to form a lubricating film between each segment and an inner face of said jacket, said segment thus constituting a bearing bush with a hydrostatic effect, separated from each adjacent bush of a same circular band by a said groove, said grooves isolating a fluid film of each bush by collecting excess fluid and discharging said excess fluid toward said recesses;
(g) each common feed duct being provided with individual means for adjustment of pressure of said fluid film between each bush and a corresponding zone of said jacket for application on said jacket of radial forces of adjustable intensity from bush to bush, the pressure of said fluid film in bushes of each pair being at a same level.

3. A working roll for a rolling mill comprising a support stand composed of two spaced uprights between which is placed a plurality of superposed rolls mounted for rotation about substantially parallel axes, respectively two working rolls (A, A') delimiting a gap for passage of a product (B) to be rolled, said working rolls respectively bearing on at least two backup rolls, said working roll comprising
(a) a stationary central shaft having an axis and a cylindrical outer face;
(b) a tubular jacket mounted for rotation on said central shaft, said tubular jacket having a cylindrical outer face and a cylindrical inner face with a diameter substantially equal, apart from play, to a diameter of said cylindrical outer face of said shaft;
(c) said central shaft being provided with two recesses, respectively on each side of a vertical plane of symmetry (P) constituted by a squeezing plane passing through axes of said working rolls (A, A'), said recesses (21, 21') dividing said cylindrical outer face into two circular bands (23, 23') respectively covering two diametrically opposed angular sectors centered on said plane of symmetry (P);
(d) each said circular band being respectively divided into a sequence of segments by a series of grooves located in spaced planes (P1, P2, P3 . . . ) perpendicular to said axis of said shaft and hollowed out in a thickness of said shaft, said grooves provided, respectively, on two opposite bands being located two by two in same planes and said segments being disposed in pairs of two diametrically opposed segments, each having a form of an arched rectangle;
(e) a feed circuit connected to a plurality of ducts each opening out upstream of each segment in a direction of rotation of said jacket for introducing a fluid to be distributed on a surface of said segments and escaping downstream, each segment thus constituting a bearing bush with a hydrodynamic effect, separated from each adjacent bush of a same circular band by a corresponding groove, said grooves isolating a fluid film of each bush by collecting excess fluid and discharging it toward said recesses;
(f) each segment being provided with at least one recess, recesses of two segments of a same pair being connected respectively by ducts to a common duct, for recovering at least a part of fluid circulating along said bearing bush and connected to a fluid-return circuit;
(g) each common recovery duct being provided with individual means for adjustment of a pressure of said fluid film between each bush and a corresponding zone of said jacket for application on said jacket of radial forces of adjustable intensity from bush to bush, said pressure of said fluid film in bushes of each pair being at a same level.

4. A working roll as claimed in claim 1 or 2, said working roll being associated with a flatness control roller (D) equipped with a series of sensors for measuring a distribution of stresses in adjacent zones staggered over an entire width of a rolled product, such that each zone of said flatness control roller (D) corresponds to a zone covered by a bush of a roll (A), and wherein pressures of said oil film in said bushes are adjusted individually as a function of indications given, respectively, by said sensors in corresponding zones of said flatness control roller (D).

5. A working roll for a rolling mill comprising a support stand composed of two spaced uprights between which is placed a plurality of superposed rolls mounted for rotation about substantially parallel axes, respectively two working rolls (A, A') delimiting a gap for passage of a product (B) to be rolled, said working rolls respectively bearing on at least two backup rolls, said working roll comprising
(a) a stationary central shaft having an axis and a cylindrical outer face;
(b) a tubular jacket mounted for rotation on said central shaft, said tubular jacket having a cylindrical outer face and a cylindrical inner face with a diameter substantially equal, apart from play, to a diameter of said cylindrical outer face of said shaft;
(c) said central shaft being provided with two recesses, respectively on each side of a vertical plane of symmetry (P) constituted by a squeezing plane passing through axes of said working rolls (A, A'), said recesses dividing said cylindrical outer face into two circular bands respectively covering two diametrically opposed angular sectors centered on said plane of symmetry (P);
(d) each said circular band being respectively divided into a sequence of segments by a series of grooves located in spaced planes (P1, P2, P3 . . . ) perpendicular to said axis of said shaft and hollowed out in a thickness of said shaft, said grooves provided, respectively, on two opposite bands being located two by two in same planes and said segments being disposed in pairs of two diametrically opposed segments, each having a form of an arched rectangle;
(e) means for circulating a pressurized fluid between each segment and an inner face of said jacket, each segment thus constituting a bearing bush which is separated from each adjacent bush of a same circular band by a said groove, said grooves isolating a fluid film of each bush, by collecting excess fluid and discharging said excess fluid toward said recesses;
(f) means for individual adjustment of a pressure of said fluid film between each bush and a corresponding zone of said jacket for application on said jacket of radial forces of adjustable intensity from bush to bush, the pressure of said fluid film in bushes of each pair being at a same level;

(g) said tubular jacket comprising an open end to permit said jacket to be slipped over said central shaft and an end closed by a back plate, said central shaft extending from a free end outside said jacket as far as an inner end adjacent said back plate;

(h) said working roll (A) being guided on said uprights of said stand, respectively by guide parts provided on said free end of said central shaft and by a chock mounted on a journal fixed on said back plate of said jacket and comprising an outer guide part and an inner part which is integral in rotation with said jacket;

(i) said jacket being mounted for rotation on said central shaft about two bearings respectively located on said free end of said shaft, on a side of said open end of said jacket, and on said inner end of said shaft on a side of said back plate of said jacket.

* * * * *